(12) United States Patent
Urry

(10) Patent No.: US 6,333,127 B1
(45) Date of Patent: Dec. 25, 2001

(54) ELECTROCHEMICAL CELL AND CELL ASSEMBLY PROCESS

(75) Inventor: Lewis F. Urry, Elyria, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/408,642

(22) Filed: Sep. 30, 1999

(51) Int. Cl.⁷ .................................................. H01M 4/42
(52) U.S. Cl. ........................ 429/229; 429/212; 429/230; 29/623.5
(58) Field of Search .................................. 429/209, 212, 429/229, 230; 29/623.1, 623.5

(56) References Cited

U.S. PATENT DOCUMENTS

| | | |
|---|---|---|
| 2,812,377 | 11/1957 | Franquemont . |
| 3,525,647 | 8/1970 | Strauss . |
| 4,743,185 * | 5/1988 | Vu et al. ........................... 429/229 X |
| 4,963,447 | 10/1990 | Nishimura et al. .................. 429/206 |
| 5,281,497 * | 1/1994 | Kordesch et al. ................ 429/230 X |
| 5,587,254 | 12/1996 | Kojima et al. ........................ 429/206 |
| 5,645,961 * | 7/1997 | Nakagawa et al. .................. 429/229 |
| 6,022,639 * | 2/2000 | Urry .................................... 429/229 |
| 6,150,052 * | 11/2000 | Urry ................................ 429/229 X |

FOREIGN PATENT DOCUMENTS

| | | |
|---|---|---|
| 06-78927 | 10/1995 | (EP) . |
| 52-137640 * | 11/1977 | (JP) . |
| WO98-20569 | 5/1998 | (WO) . |
| WO98-50969 | 11/1998 | (WO) . |

* cited by examiner

Primary Examiner—Stephen Kalafut
(74) Attorney, Agent, or Firm—Stewart A. Fraser

(57) ABSTRACT

An electrochemical cell and method of assembling electrochemical cell having a container, an anode, a cathode, and a separator. The anode includes rounded zinc flakes coated on one surface with an absorbent gelling agent and disposed in the container. An electrolyte solution is added to the container so that at least some of the electrolyte is absorbed by the absorbent gelling agent. In addition, the zinc flakes, which may be disk-shaped, are oriented substantially perpendicular to side walls of the separator.

31 Claims, 3 Drawing Sheets

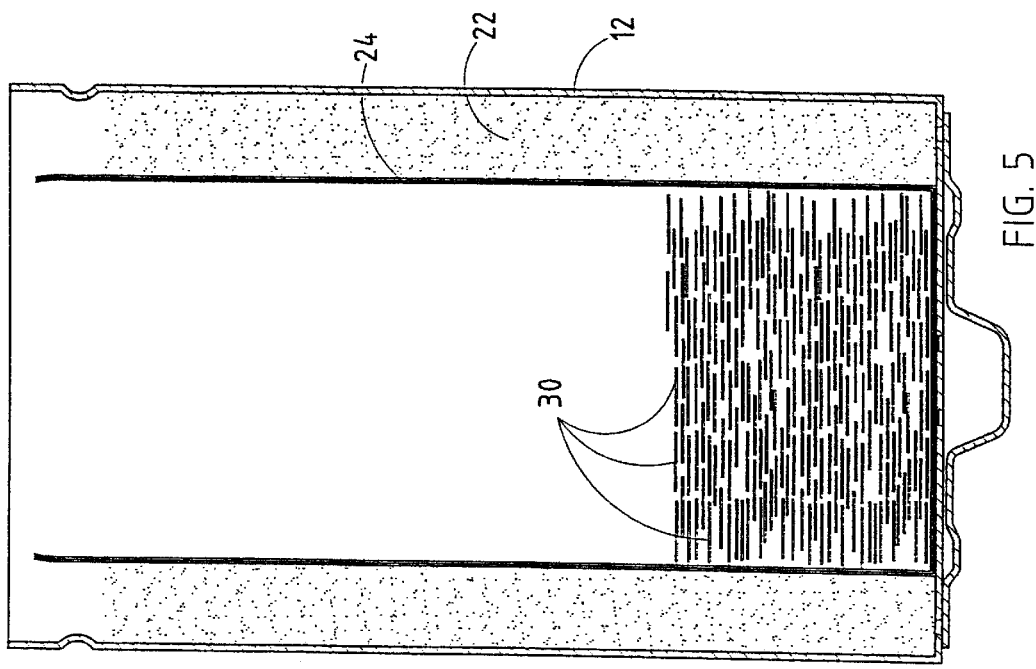
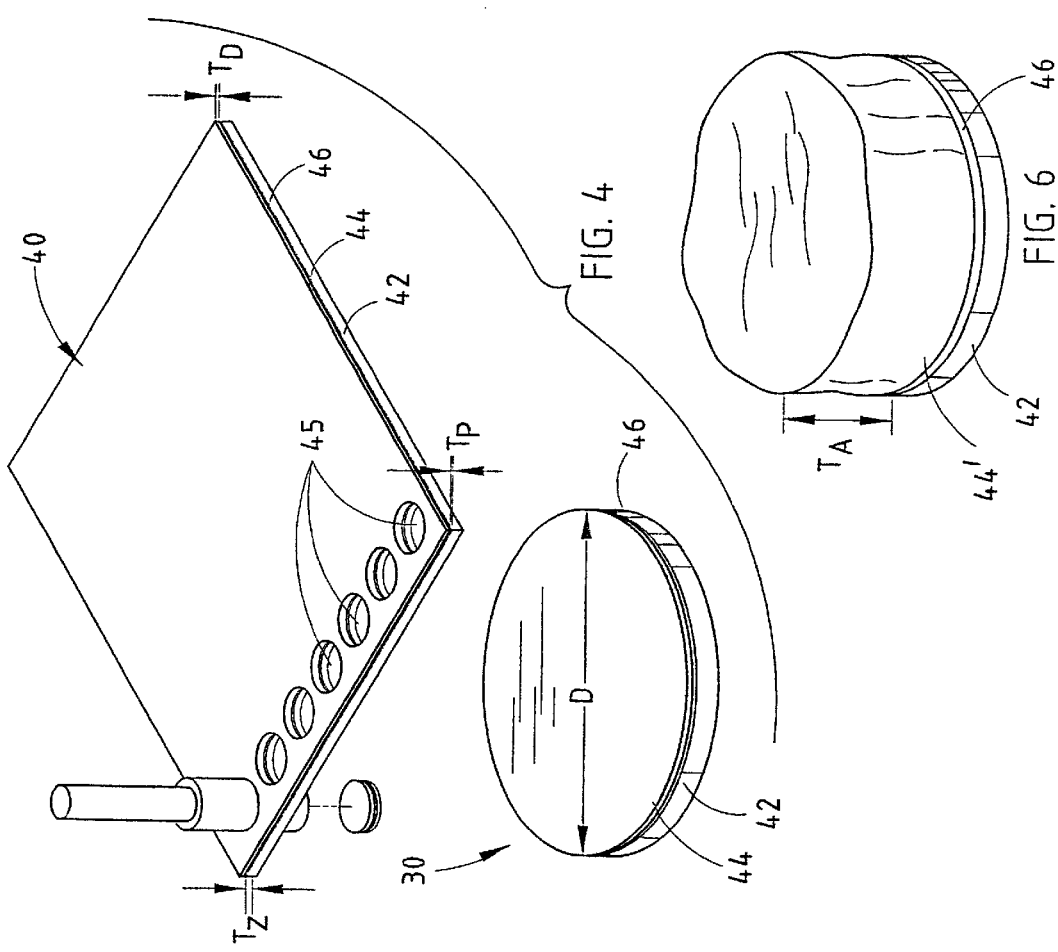

ELECTROCHEMICAL CELL AND CELL ASSEMBLY PROCESS

BACKGROUND OF THE INVENTION

The present invention generally relates to aqueous electrochemical cells and, more particularly, to an alkaline electrochemical cell having a gel-type electrode.

Conventional alkaline electrochemical cells generally include a cylindrical steel can having a positive electrode, commonly referred to as the cathode, which often comprises manganese dioxide as the active material. The electrochemical cell also includes a negative electrode, commonly referred to as the anode, which often comprises zinc powder as the active material. In conventional bobbin-type cell constructions, the anode is centrally located in a cavity within a tubularly shaped cathode. A cup-shaped separator is located between the anode and the cathode, and an alkaline electrolyte solution simultaneously contacts the anode, the cathode, and the separator. A conductive current collector is typically inserted into the anode active material, and a seal assembly, which commonly includes an annular polymeric seal, such as nylon, provides closure to the open end of the steel can to seal the active electrochemical materials in the can.

Some conventional alkaline cells commonly use a gelled anode which contains carboxymethyl cellulose (CMC), cross-linking type branched polyacrylic acid or a sodium salt thereof, natural gum, or the like as a gelling agent. Examples of conventional gelled anodes are disclosed in U.S. Pat. Nos. 5,587,254 and 4,963,447. The gelled anode is typically formed by uniformly dispersing irregularly shaped zinc powder in a gelled electrolyte containing a gelling agent, such as CMC, and an alkaline electrolyte solution, such as potassium hydroxide. The zinc powder is uniformly suspended in place by the gelling agent. The conventional gelled anode is generally preformed and injected in a gelled state into the cup-shaped separator with an injector. The gelled anode mix typically has a low viscosity and uniform concentration of zinc powder dispersed throughout the anode mix.

Zinc powder is commercially available in various particle shapes and sizes. Conventional zinc powders employed in alkaline batteries are generally characterized as irregularly shaped particles, ranging from lumps or distorted spheroids to elongated tuberous forms. These zinc particles typically have craggy or minor protrusions, and irregular surface characteristics. In conventional cells, the zinc powder is generally suspended in the gelling agent without respect to its orientation. The irregular shaped particles and non-uniform orientation of zinc particles may reduce ion permeation and water flow within the anode and may create void volume, thereby reducing available cell performance. The anode must include a minimal amount of zinc powder to provide sufficient particle-to-particle and particle-to-collector contact, yet not unnecessarily waste excessive zinc beyond the anode's reaction product capacity. Electrochemical cells have generally required a minimum of 28 percent volume of conventional zinc powder in the anode to provide sufficient electronic conductivity.

It is desirable to provide a zinc anode current carrying matrix that maintains good conductivity, high current discharge efficiency and allows for enhanced flow, high volume percent zinc concentrations, and improved packing efficiency.

SUMMARY OF THE INVENTION

The present invention improves the ion permeability of electrolyte in an electrochemical cell. To achieve this and other advantages, and in accordance with the purpose of the invention as embodied and described herein, the present invention provides for an electrochemical cell and process of assembling an electrochemical cell. The electrochemical cell comprises first and second electrodes disposed in a container. The second electrode includes an electrochemically active material including a plurality of flakes coated on at least one surface with an absorbent gelling agent. An electrolyte is disposed in the container and at least some of the electrolyte is absorbed by the absorbent gelling agent.

According to another aspect of the present invention, a process is provided for assembling an electrochemical cell. The process includes the steps of disposing a first electrode in a container, disposing a separator in the container and against a surface of the first electrode. The process also includes the steps of providing a plurality of electrochemically active flakes, preferably zinc flakes, coating an absorbent gelling agent on at least one surface of the flakes, disposing the coated flakes in the container, and orienting the flakes so that the flakes are substantially perpendicular to side walls of the separator. The process further includes the step of disposing electrolyte solution in the separator so that the gelling agent absorbs at least some of the electrolyte solution. Accordingly, a gel-type electrode may be formed within the container, and ion permeation and water flow are enhanced by the orientation of the electrochemically active flakes.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 4 illustrates formation of disk shaped zinc flakes from a coated zinc sheet;

FIG. 5 is a longitudinal cross-sectional view of a partially assembled electrochemical cell during the anode assembly process; and FIG. 6 is a perspective view of a zinc flake containing an absorbent gelling agent absorbed with electrolyte and swelled in size.

DETAILED DESCRIPTION OF THE PREFERRED EMBODIMENT

Figure 2:
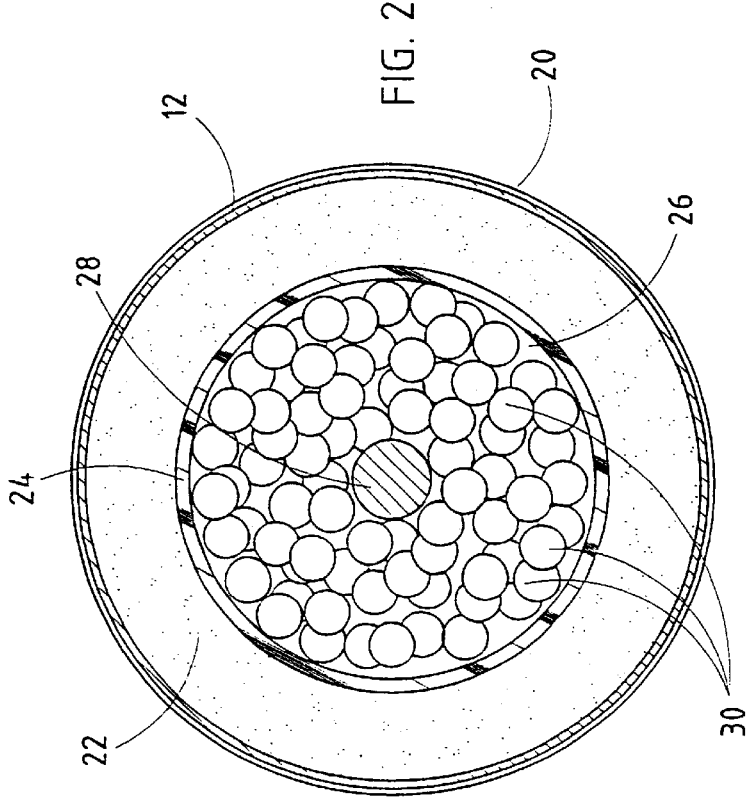
FIG. 2 is a cross-sectional view taken through line II-II of FIG. 1.
Figure 1:
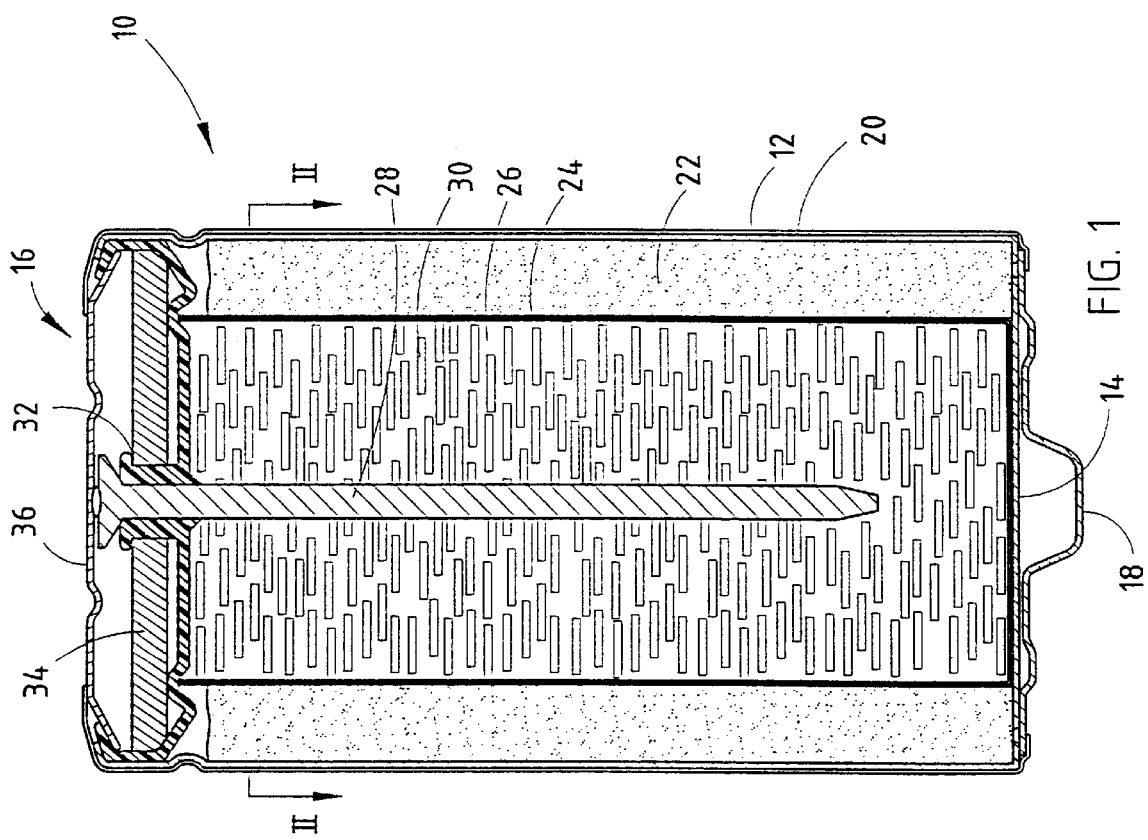
FIG. 1 is a longitudinal cross-sectional view of an electrochemical cell employing zinc flakes according to the present invention.

Referring to FIG. 1, a cylindrical electrochemical cell 10, such as an alkaline electrochemical cell according to one example, is shown therein. Electrochemical cell 10 includes a cylindrical steel can 12 having a closed bottom end 14, an open top end 16, and cylindrical side walls extending between the top and bottom ends. The closed bottom end 14 of steel can 12 further includes a positive cover 18 welded or otherwise attached thereto and formed of plated steel with a protruding nub at its center region, which forms the positive contact terminal of cell 10. A metalized, plastic film label 20 is formed about the exterior surface of steel can 12, except for the ends of steel can 12. Film label 20 may be formed over the peripheral edge of the positive cover 18 and may extend partially onto the negative cover as shown.

A tubular shaped cathode 22 is formed about the interior surface of steel can 12 and contacts can 12. According to one example, the cathode 22 comprises a mixture of manganese dioxide, graphite, potassium hydroxide solution, and additives. A separator 24, which may include a cup-shaped separator, preferably formed of a non-woven fabric that prevents migration of any solid particles in the cell 10, is disposed about the interior surface of cathode 22. An anode 26 is disposed with electrolyte inside the separator 24, generally in the center of the cell 10. The anode 26 is a gel-type anode formed of suspended zinc flakes, preferably coated with an absorbent material that serves as the gelling agent, mixed with electrolyte, and additives. Disposed in contact with the anode 26 is a current collector 28, which may include a brass nail having an elongated body and an enlarged head at one end. Accordingly, the cathode 22 is configured as the cell's positive electrode, and the anode 26 is configured as the cell's negative electrode.

Electrochemical cell 10 further includes a collector and seal assembly which seals closed the open end 16 of steel can 12. Included in the collector and seal assembly is the current collector 28, an annular polymeric seal 32, preferably of nylon, and an inner metal cover 34. The current collector 28, nylon seal 32, and inner cover 34 may be pre-assembled and inserted into the open end of the steel can 12 as an assembled unit. The inner cover 34, which is preferably formed of a rigid metal, is provided to increase the rigidity and support the radial compression of nylon seal 32, thereby improving the sealing effectiveness. The inner cover 34 is configured to contact the seal's inner upstanding wall at the central hub and the outer peripheral upstanding wall of seal 32. The current collector 28 contacts an outer negative cover 36 which forms the negative contact terminal of cell 10. The outer negative cover 36 is preferably formed of plated steel, and may be held in contact with current collector 28 via pressure contact or a weld. The outer negative cover 36 and inner cover 34 both may include vent openings (not shown) formed therein to allow for the release of pressurized gases during a cell venting condition.

The gel-type anode 26 includes disk shaped zinc flakes 30 in an amount of approximately 28–30 volume percent zinc suspended by a gelling agent. The zinc flakes are preferably uniformly distributed and are oriented substantially perpendicular to the upstanding side walls of separator 24. The anode 26 is a gel-type anode formed of zinc flakes, a gelling agent, and conventional additives, and is mixed with an electrolyte solution which may be formed of potassium hydroxide, zinc oxide, and water. The gelling agent may include a high viscosity binder having a cross-linking type branched polyacrylic acid, such as Carbopol® and, more particularly, Carbopol® 940, which is manufactured and made available by B.F. Goodrich Specialty Chemicals. The gelling agent may alternately include carboxymethyl cellulose (CMC), polyacyrylamide, sodium polyacrylate, a granular preparation of cassava starch, or other agents that are hydrolyzable in alkaline electrolyte solution. The anode additives may include corrosion preventatives such as sodium silicate and indium hydroxide.

It should be appreciated that by orienting the zinc flakes 30 substantially perpendicular to the upstanding side walls of separator 24, the diffusion of ions to the reaction site is facilitated, as is the migration of water from the center region of the anode 26 to the cathode 22 where the water has been used up by the discharge reaction. In addition, zinc oxide and/or hydroxide formed at the reaction zinc can be displaced into the center of the anode 26 between the smooth rounded pieces of zinc by the additional material formed on discharge, which is achieved much easier as compared to the use of a jumbled suspension of zinc powder of conventional types. Further, by employing round disk-shaped zinc flakes, there are no sharp edges present to penetrate the separator 24.

Figure 3:
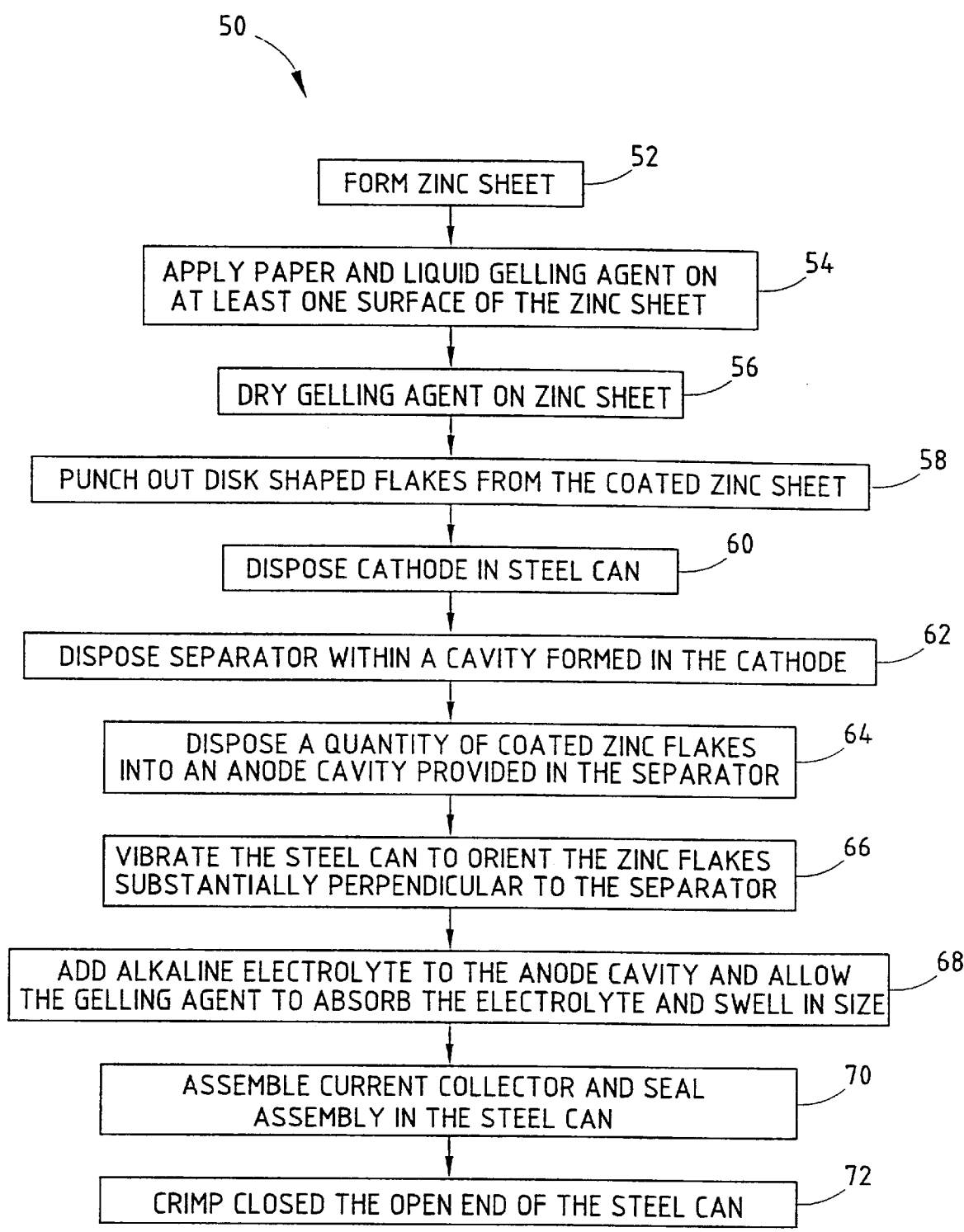
FIG. 3 is a flow diagram illustrating the process of assembling the electrochemical cell of FIG. 1.

Referring to FIG. 3, a process 50 for assembling an electrochemical cell having zinc flakes coated with an absorbent gelling agent and oriented as explained herein is provided. The process 50 includes step 52 of forming a flat sheet of anode electrochemically active material, preferably zinc, which may include pouring molten zinc on a sheet pan and cooling the molten zinc until it solidifies. The zinc may include pure zinc, or an alloy comprising an approximate amount of one or more of the metals selected from the group consisting of indium, lead, bismuth, lithium, calcium, aluminum, and the balance being zinc. Next, step 54 includes applying a sheet of paper and a liquid gelling agent on at least one surface of the zinc sheet. The paper aids in adhering the gelling agent to the zinc, however, it should be appreciated that the gelling agent could be applied directly to the zinc without the use of paper. The liquid gelling agent may be formed by mixing deionized water with Carbopol® 940 to allow the particles to hydrate without lumping together until the solution becomes saturated and consists of a jelly-like solution. In step 56, the gelling agent is dried to evaporate the water and leave a dry coating on the zinc sheet. The drying step 56 may include placing the sheet of zinc coated with water saturated gelling agent in an oven at a sufficient temperature, such as 100° C., for a sufficient period of time to evaporate the water until the gelling agent coating is dry and solid.

Referring to FIG. 4, the dry coated zinc sheet 40 is illustrated having paper layer 46 and dried gelling agent 44. The zinc sheet 40 preferably has a thickness $T_z$ in the range of about 0.0254 to 0.254 mm, and more preferably of approximately 0.0508 mm, while the dry paper layer 46 has a thickness $T_p$ of approximately 0.0127 mm, and the dried gelling agent layer 44 has a thickness $T_D$ of approximately 0.00762 mm, according to one example. Referring back to FIG. 3, step 58 includes punching out disk-shaped zinc flakes 30 from the coated zinc sheet 40, which leaves openings 45 in sheet 40. The disk-shaped zinc flakes 30 are rounded, and have a diameter $D_z$ which may be equal to approximately 1.016 mm, according to one example. According to the example provided above, each of zinc flakes 30 preferably has a high diameter D to thickness $T_z$ aspect ratio of at least ten, and more preferably of approximately twenty.

Cell assembly process 50 further includes step 60 of disposing the cathode 22 in the steel can 12 to form a tubularly shaped cathode about the interior surface of steel can 12, as shown in FIG. 5. The cathode 22 may be formed using known cathode molding techniques, such as impact molding and ring molding techniques. Next, in step 62, the cup-shaped separator 24 is disposed in steel can 12 and against the inner walls of cathode 22. Once the cathode 22 and separator 24 are in place in can 12, process 50 proceeds to step 64 to dispose a quantity of coated zinc flakes 30 into the anode cavity that is centrally provided in the separator 24. The quantity of zinc flakes 30 preferably includes zinc in the amount of approximately 28–30 volume percent (or about 70 percent weight) of the anode 26. With the steel can 12 oriented as shown in FIG. 5, process 50 proceeds to step 66 to vibrate the steel can 12 to orient the zinc flakes 30 so that the zinc flakes 30 are substantially perpendicular to the upstanding side walls of separator 24. The step 66 of vibrating may be achieved with the use of a vibration machine.

With the zinc flakes 30 oriented substantially perpendicular to the side walls of separator 24, process 50 proceeds to step 68 to add alkaline electrolyte to the anode cavity so that the dry gelling agent 44 absorbs the electrolyte and swells in size to substantially consume the volume of the anode cavity. According to one example, the dried gelling agent 44 may absorb enough electrolyte solution to expand in thickness twenty times its original dry thickness. Referring to FIG. 6, one example of a disk having a swelled gelling agent 44' is illustrated therein. The dry gelling agent 44 having a dry thickness $T_D$ absorbs electrolyte and expands as shown by swelled gelling agent 44' having an absorbed thickness $T_A$, such that absorbed thickness $T_A$ is approximately twenty times greater than dry thickness $T_D$.

Once the gelling agent has absorbed enough electrolyte so that the anode has substantially consumed the anode cavity, process 50 proceeds to step 70 to assemble the current collector and seal assembly in the steel can. It should be appreciated that the current collector, which contacts the outer negative terminal, is disposed into the anode to make sufficient current contact with the zinc flakes 30, particularly the zinc 42. To complete process 50, the closed open end of steel can 12 is crimped as provided in step 72 to complete assembly of electrochemical cell 10.

Accordingly, the rounded zinc flakes 30 and uniform orientation of zinc flakes 30 substantially perpendicular to the upstanding side walls of separator 24 allows for enhanced ion permeability and water transfer within the cell 10. In addition, the electrochemical cell 10 may be assembled by inserting dry zinc and swellable gelling agent in a dry state into the steel can 12 and separately adding the electrolyte solution, without requiring use of gel compatible injection equipment. The present invention therefore provides for a low cost electrochemical cell with enhanced cell performance. While the present invention employs zinc as the active electrochemical material, it should be appreciated that other electrochemically active materials such as magnesium and cadmium may likewise employ an absorbent gelling agent coated thereon in accordance with the teachings of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a container;
   a first electrode disposed in said container;
   a second electrode disposed in said container and having an electrochemically active material, said electrochemically active material including a plurality of flakes coated on at least one surface with an absorbent gelling agent, wherein said flakes are substantially disk-shaped; and
   an electrolyte disposed in said container, wherein at least some of said electrolyte is absorbed by said absorbent gelling agent.

2. The electrochemical cell as defined in claim 1, wherein said flakes have a thickness in the range of about 0.0254 to 0.254 mm.

3. The electrochemical cell as defined in claim 2, wherein said flakes have a thickness of approximately 0.0508 mm and a diameter of approximately 1.016 mm.

4. An electrochemical cell comprising:
   a container;
   a first electrode disposed in said container;
   a second electrode disposed in said container and having an electrochemically active material, said electrochemically active material including a plurality of flakes coated on at least one surface with an absorbent gelling agent, wherein said flakes are substantially disk shaped and have a diameter to thickness aspect ratio of at least ten; and
   an electrolyte disposed in said container, wherein at least some of said electrolyte is absorbed by said absorbent gelling agent.

5. The electrochemical cell as defined in claim 1, wherein said electrochemically active material comprises zinc.

6. The electrochemical cell as defined in claim 1, wherein said gelling agent comprises cross-linked type branched polyacrylic acid.

7. The electrochemical cell as defined in claim 1, wherein said gelling agent material comprises carboxymethyl cellulose.

8. An electrochemical cell comprising:
   a container;
   a first electrode disposed in said container;
   a second electrode disposed in said container and having an electrochemically active material, said electrochemically active material including a plurality of flakes coated on at least one surface with an absorbent gelling agent;
   an electrolyte disposed in said container, wherein at least some of said electrolyte is absorbed by said absorbent gelling agent; and
   a separator disposed between said first and second electrodes, wherein said flakes have a substantially planar surface oriented substantially perpendicular to an upstanding wall of said separator.

9. The electrochemical cell as defined in claim 8, wherein said substantially perpendicular orientation is provided by vibrating said container to orient said flakes.

10. An electrochemical cell comprising:
    a container;
    a first electrode disposed in said container;
    a second electrode disposed in said container and having an electrochemically active material, said electrochemically active material including a plurality of flakes coated on at least one surface with an absorbent gelling agent;
    an electrolyte disposed in said container, wherein at least some of said electrolyte is absorbed by said absorbent gelling agent; and
    a layer of paper disposed between said electrochemically active material and said absorbent gelling agent.

11. An electrochemical cell comprising:
    a container;
    a first electrode disposed in said container;
    a separator disposed against said first electrode; and
    a second electrode disposed in said container and having an electrochemically active material, said electrochemically active material including a plurality of flakes having a substantially planar body, wherein said plurality of flakes are oriented substantially perpendicular to a wall of said separator.

12. The electrochemical cell as defined in claim 11, wherein said flakes of electrochemically active material are coated on at least one surface with an absorbent gelling agent.

13. The electrochemical cell as defined in claim 12 further comprising electrolyte disposed in said container, wherein at least some of said electrolyte is absorbed by said absorbent gelling agent.

14. The electrochemical cell as defined in claim 11, wherein said electrochemically active material comprises zinc.

15. The electrochemical cell as defined in claim 14, wherein said zinc is formed in a substantially disk shape.

16. The electrochemical cell as defined in claim 11, wherein said flakes have a thickness in the range of 0.0254 to 0.254 mm.

17. The electrochemical cell as defined in claim 16, wherein said zinc flakes have a thickness of approximately 0.0508 mm and a diameter of approximately 1.016 mm.

18. The electrochemical cell as defined in claim 11, wherein said flakes are substantially disk shaped and have a diameter to thickness aspect ratio of at least ten.

19. The electrochemical cell as defined in claim 12, wherein said gelling agent comprises cross-linked type branched polyacrylic acid.

20. The electrochemical cell as defined in claim 12, wherein said gelling agent comprises carboxymethyl cellulose.

21. The electrochemical cell as defined in claim 11, wherein said substantially perpendicular orientation is provided by vibrating said container to orient said flakes.

22. A process of assembling an electrochemical cell, comprising the steps of:

disposing a first electrode in a container;

disposing a separator in said container and against a surface of said first electrode;

providing a plurality of electrochemically active flakes;

coating an absorbent gelling agent on at least one surface of said electrochemically active flakes;

disposing said coated flakes in said container;

orientating said flakes so that said flakes are substantially perpendicular to side walls of said separator; and disposing electrolyte solution in said separator so that the gelling agent absorbs at least some of the electrolyte solution.

23. The process as defined in claim 22, wherein said electrochemically active material comprises zinc.

24. The process as defined in claim 23, wherein said step of providing said electrochemically active flakes includes the steps of:

forming a sheet of zinc material;

applying said absorbent gelling agent to a surface of said zinc sheet; and punching out disk-shaped zinc flakes from said sheet.

25. The process as defined in claim 22, wherein said step of coating said absorbent gelling agent comprises the steps of:

applying said gelling agent in a liquid state; and drying said gelling agent.

26. The process as defined in claim 22, wherein said step of orienting said flakes is achieved by vibrating said container.

27. A process of assembling an electrochemical cell, comprising the step of:

disposing a first electrode in a container;

disposing a separator in said container and against the surface of said first electrode;

applying an absorbent gelling agent on a surface of an electrochemical active material;

forming said electrochemically active material into a plurality of flakes, wherein said flakes are substantially disk-shaped;

disposing said plurality of flakes of electrochemically active material in said container to provide a second electrode; and disposing electrolyte solution in said separator so that the gelling agent absorbs at least some of the electrolyte solution.

28. The process as defined in claim 27, wherein said electrochemically active material comprises zinc.

29. A process of assembling an electrochemical cell, comprising the steps of:

disposing a first electrode in a container;

disposing a separator in said container and against the surface of said first electrode;

applying an absorbent gelling agent on a surface of an electrochemically active material;

forming said electrochemically active material into a plurality of flakes, wherein said electrochemically active material comprises zinc;

disposing said plurality of flakes of electrochemically active material in said container to provide a second, electrode; and disposing electrolyte solution in said separator so that the gelling agent absorbs at least some of the electrolyte solution, wherein said step of forming said electrochemically active flakes includes the steps of:

forming a sheet of zinc material;

applying said absorbent gelling agent to a surface of said zinc sheet; and punching out disk-shaped zinc flakes from said sheet.

30. The process as defined in claim 27, wherein said step of applying said absorbent gelling agent comprises the steps of:

applying said gelling agent in a liquid state; and drying said gelling agent.

31. A process of assembling an electrochemical cell, comprising the steps of:

disposing a first electrode in a container;

disposing a separator in said container and against the surface of said first electrode;

applying an absorbent gelling agent on a surface of an electrochiemically active material;

forming said electrochemically active material into a plurality of flakes;

disposing said plurality of flakes of electrochemically active material in said container to provide a second electrode;

vibrating said container to orient said flakes substantially perpendicular to a separator wall between said first and second electrodes; and disposing electrolyte solution in said separator so that the gelling agent absorbs at least some of the electrolyte solution.

* * * * *